US012617935B2

(12) United States Patent
Cogen et al.

(10) Patent No.: US 12,617,935 B2
(45) **Date of Patent: *May 5, 2026**

(54) POLYMERS OF ETHYLENE AND MONOCYCLIC ORGANOSILOXANE

(71) Applicant: Dow Global Technologies LLC, Midland, MI (US)

(72) Inventors: Jeffrey M. Cogen, Collegeville, PA (US); Yabin Sun, Shanghai (CN); Timothy J. Person, Collegeville, PA (US); Arkady L. Krasovskiy, Lake Jackson, TX (US); Pyung Lee, Wilmington, DE (US); Hayley A. Brown, Lake Jackson, TX (US); Sean W. Ewart, Lake Jackson, TX (US)

(73) Assignee: Dow Global Technologies LLC, Midland, MI (US)

(*) Notice: Subject to any disclaimer, the term of this patent is extended or adjusted under 35 U.S.C. 154(b) by 446 days.

This patent is subject to a terminal disclaimer.

(21) Appl. No.: 18/007,201

(22) PCT Filed: Jul. 29, 2020

(86) PCT No.: PCT/CN2020/105395

§ 371 (c)(1), (2) Date: Jan. 27, 2023

(87) PCT Pub. No.: WO2022/021115

PCT Pub. Date: Feb. 3, 2022

(65) Prior Publication Data

US 2023/0242743 A1 Aug. 3, 2023

(51) Int. Cl.
*C08L 23/04* (2006.01)

(52) U.S. Cl.
CPC ......... *C08L 23/04* (2013.01); *C08L 2207/066* (2013.01)

(58) Field of Classification Search
None
See application file for complete search history.

(56) References Cited

U.S. PATENT DOCUMENTS 3,859,247 A 1/1975 Mackenzie, Jr.
3,946,099 A 3/1976 Mackenzie, Jr.
(Continued)

FOREIGN PATENT DOCUMENTS

CN 108359036 A 8/2018
WO 1996/39459 A1 12/1996
(Continued)

*Primary Examiner* — Satya B Sastri
(74) *Attorney, Agent, or Firm* — Boyle Fredrickson S.C.

(57) ABSTRACT

An ethylene-based polymer composition includes units derived from ethylene, units derived from a comonomer, and an optionally units derived from a termonomer. The comonomer is a monocyclic organosiloxane (MOCOS) of formula (I) $[R^1, R^2SiO_{2/2}]_n$ wherein n is an integer greater than or equal to 3, each $R^1$ is independently a $(C_2-C_4)$ alkenyl or a $H_2C{=}C(R^{1a})—C({=}O)—O—(CH_2)_m—$ wherein $R^{1a}$ is H or methyl, m is an integer from 1 to 4, and each $R^2$ is independently H, $(C_1-C_4)$ alkyl, phenyl, or $R^1$.

8 Claims, 1 Drawing Sheet

(56) References Cited

U.S. PATENT DOCUMENTS

| | | | | |
|---|---|---|---|---|
| 4,005,254 | A | 1/1977 | Mackenzie, Jr. | |
| 4,208,342 | A | 6/1980 | Bargain et al. | |
| 7,037,992 | B2 | 5/2006 | Wilson, Jr. et al. | |
| 8,809,478 | B2 | 8/2014 | Saito et al. | |
| 9,365,671 | B2 | 6/2016 | Kim et al. | |
| 11,732,066 | B2 * | 8/2023 | Yang | C08K 5/549 428/500 |
| 2003/0166817 | A1 | 9/2003 | Barfurth et al. | |
| 2013/0075154 | A1 | 3/2013 | Saito et al. | |
| 2017/0190895 | A1 | 7/2017 | Ham et al. | |
| 2020/0062943 | A1 | 2/2020 | Chaudhary et al. | |
| 2020/0199270 | A1 | 6/2020 | Zhang et al. | |
| 2020/0199309 | A1 | 6/2020 | Yang et al. | |
| 2020/0199340 | A1 | 6/2020 | Sun et al. | |

FOREIGN PATENT DOCUMENTS

| | | | | |
|---|---|---|---|---|
| WO | 2003/044066 | A2 | 5/2003 | |
| WO | WO-2019000654 | A1 * | 1/2019 | C08F 210/02 |
| WO | WO-2020139993 | A1 * | 7/2020 | H10F 19/804 |

* cited by examiner

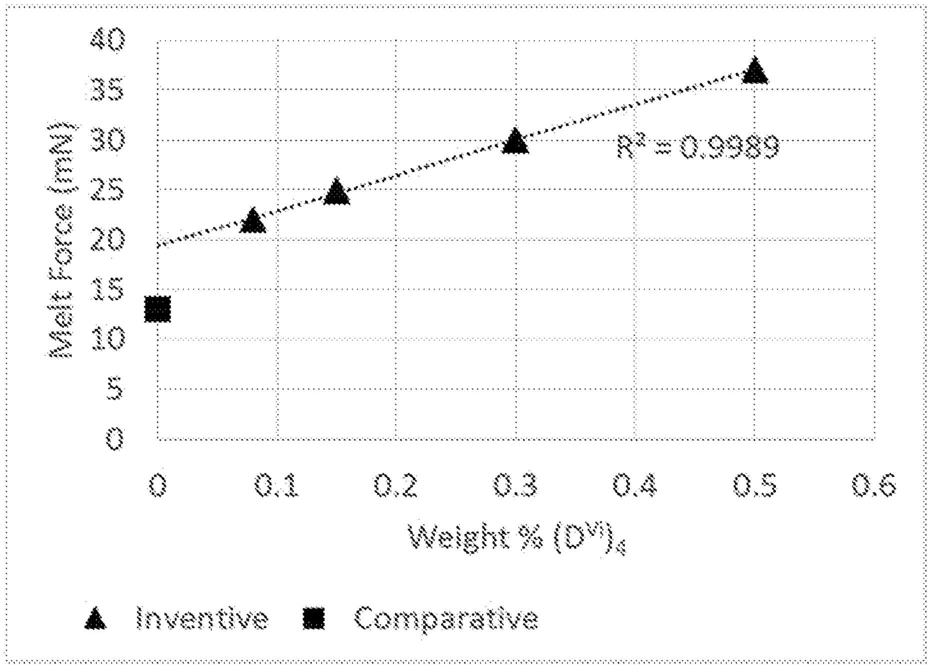
Melt Force (mN)
40
35
30
25
20
15
10
5
0
R² = 0.9989
0
0.1
0.2
0.3
0.4
0.5
0.6
Weight % (D^V)4
Inventive
Comparative

POLYMERS OF ETHYLENE AND MONOCYCLIC ORGANOSILOXANE

BACKGROUND

The level of branching in an ethylene-based polymer, such as low density polyethylene (LDPE) for example, is due predominantly to the reactor design (autoclave or tubular) and the polymerization conditions used to make the LDPE. Known are branching agents for increasing the level of branching in an LDPE. However, the process conditions required to achieve a modified LDPE with a high level of branching, often result in a final product with inferior properties, including a higher content of a low molecular weight extractable fraction.

Thus, the art recognizes the on-going need for LDPE with increased melt strength vis-h-vis increased branching levels, the LDPE prepared under polymerization conditions that maintain good polymer properties.

SUMMARY

The present disclosure is directed to an ethylene-based polymer composition. In an embodiment, the ethylene-based polymer composition includes units derived from ethylene, units derived from a comonomer, and an optionally units derived from a termonomer. The comonomer is a monocyclic organosiloxane (MOCOS) of formula (I)

$[R^1,R^2SiO_{2/2}]_n$ wherein n is an integer greater than or equal to 3, each $R^1$ is independently a $(C_2\text{-}C_4)$alkenyl or a $H_2C{=}C(R^{1a})—C({=}O)—O—(CH_2)_m—$ wherein $R^{1a}$ is H or methyl, m is an integer from 1 to 4, and each $R^2$ is independently H, $(C_1\text{-}C_4)$alkyl, phenyl, or $R^1$.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure).

The numerical ranges disclosed herein include all values from, and including, the lower and upper value. For ranges containing explicit values (e.g., from 1 or 2, or 3 to 5, or 6, or 7), any subrange between any two explicit values is included (e.g., the range 1-7 above includes subranges of from 1 to 2; from 2 to 6; from 5 to 7; from 3 to 7; from 5 to 6; etc.).

Unless stated to the contrary, implicit from the context, or customary in the art, all parts and percents are based on weight and all test methods are current as of the filing date of this disclosure.

An "acrylate" as used herein, is a monomer containing the Structure (A) below:

Structure (A)

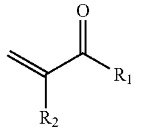

wherein $R_1$ is a hydroxyl group or a C-Cis alkoxy group and $R_2$ is H or $CH_3$. Acrylate-based monomers include acrylates and methacrylates.

An "alkane" is a saturated hydrocarbon. An "alkyl" (or "alkyl group") is an alkane having a valence (typically univalent).

An "alkene" is a hydrocarbon containing a carbon-carbon double bond. An "alkenyl" (or "alkenyl group") is an alkene having a valence (typically univalent)

The term "allyl" (or "allyl group") is a univalent unsaturated $C_3H_5$ hydrocarbon. In other words, an allyl group is propene minus one hydrogen atom.

The terms "blend" or "polymer blend," as used, refers to a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding), or the micro level (for example, simultaneous forming within the same reactor).

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably.

The term "ethylene monomer," or "ethylene," as used herein, refers to a chemical unit having two carbon atoms with a double bond there between, and each carbon bonded to two hydrogen atoms, wherein the chemical unit polymerizes with other such chemical units to form an ethylene-based polymer composition.

A "hydrocarbon" is a compound containing only hydrogen atoms and carbon atoms. A "hydrocarbonyl" (or "hydrocarbonyl group") is a hydrocarbon having a valence (typically univalent). A hydrocarbon can have a linear structure, a cyclic structure, or a branched structure.

The term "linear low density polyethylene," (or "LLDPE") as used herein, refers to a linear ethylene/α-olefin copolymer containing heterogeneous short-chain branching distribution comprising units derived from ethylene and units derived from at least one $C_3$-$C_{10}$ α-olefin, or $C_4$-$C_8$ α-olefin comonomer. LLDPE is characterized by little, if any, long chain branching, in contrast to conventional LDPE. LLDPE has a density from 0.910 g/cc to less than 0.940 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

The term "low density polyethylene," (or LDPE) as used herein, refers to a polyethylene having a density from 0.910 g/cc to less than 0.940 g/cc, or from 0.918 g/cc to 0.930 g/cc, and long chain branches with a broad molecular weight distribution (MWD)—i.e., "broad MWD" from 4.0 to 20.0.

An "olefin" is an unsaturated, aliphatic hydrocarbon having a carbon-carbon double bond.

The term "phenyl" (or "phenyl group") is a $C_6H_5$ aromatic hydrocarbon ring having a valence (typically univalent).

The term "polymer" or a "polymeric material," as used herein, refers to a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

Test Methods

Density is measured in accordance with ASTM D792, Method B. Results are reported in grams per cubic centimeter (g/cc).

Fourier Transform Infrared analysis ("FTIR")

Determination of the amount of terminal and internal trans double bonds per 1000 carbons (or "1000C") was done by Fourier Transform Infrared analysis ("FTIR"). Sample films (approximately 250-300 microns in thickness) used for FTIR analysis were compression molded by pressing approximately 0.5 g of pellets of the sample in a Carver hydraulic press with heated platens set to 190° C. The amount of terminal alkenes and internal alkenes per 1000 carbons were measured following a procedure similar to the one outlined in ASTM method D6248. FTIR measures internal alkene bonds in the trans configuration, internal alkene bonds in the cis configuration are not detectable by FTIR.

Gel Permeation Chromatography (GPC)

The chromatographic system consisted of a PolymerChar GPC-IR (Valencia, Spain) high temperature GPC chromatograph equipped with an internal IR5 infra-red detector (IR5) and 4-capillary viscometer (DV) coupled to a Precision Detectors (Now Agilent Technologies) 2-angle laser light scattering (LS) detector Model 2040. For all absolute Light scattering measurements, the 15 degree angle is used for measurement. The autosampler oven compartment was set at 160° Celsius and the column compartment was set at 150° Celsius. The columns used were 4 Agilent "Mixed A" 30 cm 20-micron linear mixed-bed columns. The chromatographic solvent used was 1,2,4 trichlorobenzene (CAS 120-82-1, HPLC grade from Fisher Scientific) and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with at least 20 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene}=A\times(M_{polystyrene})^B \quad \text{(EQ1)}$$

where M is the molecular weight, A has a value of 0.4315 and B is equal to 1.0.

A polynomial between $3^{rd}$ and $5^{th}$ order was used to fit the respective polyethylene-equivalent calibration points. A small adjustment to A (from approximately 0.375 to 0.440) was made to correct for column resolution and band-broadening effects such that a homopolymer polyethylene standard with a molecular weight of 120,000.

The total plate count of the GPC column set was performed with Eicosane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left(\frac{(RV_{Peak\ Max}}{\text{Peak Width at } \frac{1}{2} \text{ height}}\right)^2 \quad \text{(EQ2)}$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad \text{(EQ 3)}$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 1609 Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum^{i} IR_i}{\sum^{i} \left(IR_i / M_{polyethylene_i}\right)} \quad \text{(EQ 4)}$$

$$Mw_{(GPC)} = \frac{\sum^{i} \left(IR_i * M_{polyethylene_i}\right)}{\sum^{i} IR_i} \quad \text{(EQ 5)}$$

$$Mz_{(GPC)} = \frac{\sum^{i} \left(IR_i * M^2_{polyethylene_i}\right)}{\sum^{i} \left(IR_i * M_{polyethylene_i}\right)} \quad \text{(EQ 6)}$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−2% of the nominal flowrate.

$$\text{Flowrate(effective)} = \text{Flowrate}_{(nominal)} * \left(RV_{(FM\ Calibrated)} / RV_{(FM\ Sample)}\right) \quad \text{(EQ7)}$$

Triple Detector GPC (TDGPC)

The chromatographic system, run conditions, column set, column calibration and calculation conventional molecular weight moments and the distribution were performed according to the method described in Gel Permeation Chromatography (GPC).

For the determination of the viscometer and light scattering detector offsets from the IR5 detector, the Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software.

The absolute molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from one or more of the polyethylene standards mentioned below, and a refractive index concentration coefficient, dn/dc, of 0.104. Generally, the mass detector response (IR5) and the light scattering constant (determined using GPCOne™) should be determined from a linear standard with a molecular weight in excess of about 50,000 g/mole. The viscometer calibration (determined using GPCOne™) can be accomplished using the methods described by the manufacturer, or, alternatively, by using the published values of suitable linear standards, such as Standard Reference Materials (SRM) 1475a (available from National Institute of Standards and Technology (NIST)). A viscometer constant (obtained using GPCOne™) is calculated which relates specific viscosity area (DV) and injected mass for the calibration standard to its intrinsic viscosity. The chromatographic concentrations are assumed low enough to eliminate addressing 2nd viral coefficient effects (concentration effects on molecular weight).

The absolute weight average molecular weight ($MW_{(Abs)}$) is obtained (using GPCOne™) from the Area of the Light Scattering (LS) integrated chromatogram (factored by the light scattering constant) divided by the mass recovered from the mass constant and the mass detector (IR5) area. The molecular weight and intrinsic viscosity responses are linearly extrapolated at chromatographic ends where signal to noise becomes low (using GPCOne™). Other respective moments, $Mn_{(Abs)}$ and $Mz_{(Abs)}$ are be calculated according to Equations 8-9 as follows:

$$Mn_{(Abs)} = \frac{\sum^{i} IR_i}{\sum^{i} \left(IR_i / M_{Absolute_i}\right)} \quad \text{(EQ 8)}$$

-continued $$Mz_{(Abs)} = \frac{\sum_i \left( IR_i * M^2_{Absolute_i} \right)}{\sum_i \left( IR_i * M_{Absolute_i} \right)} \qquad \text{(EQ 9)}$$

gpcBR Branching Index by Triple Detector GPC (3D-GPC)

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the infrared (IR5) chromatogram. Linear polyethylene standards are then used to establish polyethylene and polystyrene Mark-Houwink constants. Upon obtaining the constants, the two values are used to construct two linear reference conventional calibrations for polyethylene molecular weight and polyethylene intrinsic viscosity as a function of elution volume, as shown in Equations (10) and (11):

$$M_{PE} = (K_{PS}/K_{PE})^{1/\alpha_{PE}+1} - M_{PS}^{\alpha_{PS}+1/\alpha_{PE}+1} \qquad \text{(Eq. 10)}$$

$$[\eta]_{PE} = K_{PS} \cdot M_{PS}^{\alpha+1}/M_{PE} \qquad \text{(Eq. 11)}.$$

The gpcBR branching index is a robust method for the characterization of long chain branching as described in Yau, Wallace W., "Examples of Using 3D-GPC-TREF for Polyolefin Characterization," Macromol. Symp., 2007, 257, 29-45. The index avoids the "slice-by-slice" 3D-GPC calculations traditionally used in the determination of g' values and branching frequency calculations, in favor of whole polymer detector areas. From 3D-GPC data, one can obtain the sample bulk absolute weight average molecular weight (Mw, Abs) by the light scattering (LS) detector, using the peak area method. The method avoids the "slice-by-slice" ratio of light scattering detector signal over the concentration detector signal, as required in a traditional g' determination.

With 3D-GPC, sample intrinsic viscosities are also obtained independently using Equation (8). The area calculation in Equation (5) and (8) offers more precision, because, as an overall sample area, it is much less sensitive to variation caused by detector noise and 3D-GPC settings on baseline and integration limits. More importantly, the peak area calculation is not affected by the detector volume offsets. Similarly, the high-precision sample intrinsic viscosity (IV) is obtained by the area method shown in Equation (12):

$$IV_w = \frac{\sum_i c_i IV_i}{\sum_i c_i} = \frac{\sum_i \eta_{sp_i}}{\sum_i c_i} = \frac{\text{Viscometer Area}}{\text{Conc.Area}} \qquad \text{(Eq. 12)}$$

where $\eta_{sp_i}$ stands for the specific viscosity as acquired from the viscometer detector.

To determine the gpcBR branching index, the light scattering elution area for the sample polymer is used to determine the molecular weight of the sample. The viscosity detector elution area for the sample polymer is used to determine the intrinsic viscosity (IV or $[\eta]$) of the sample.

Initially, the molecular weight and intrinsic viscosity for a linear polyethylene standard sample, such as SRM1475a or an equivalent, are determined using the conventional calibrations ("cc") for both molecular weight and intrinsic viscosity as a function of elution volume:

$$[\eta]_{cc} = \frac{\sum_i c_i IV_{i,cc}}{\sum_i c_i} = \frac{\sum_i c_i K(M_{i,cc})^a}{\sum_i c_i} \qquad \text{(Eq. 13)}$$

Equation (14) is used to determine the gpcBR branching index:

$$gpcBR = \left[ \left( \frac{[\eta]_{cc}}{[\eta]} \right) \left( \frac{M_w}{M_{w,cc}} \right)^{\alpha_{PE}} - 1 \right] \qquad \text{(Eq. 14)}$$

wherein $[\eta]$ is the measured intrinsic viscosity, $[\eta]_{cc}$ is the intrinsic viscosity from the conventional calibration, Mw is the measured weight average molecular weight, and $Mw_{,cc}$ is the weight average molecular weight of the conventional calibration. The weight average molecular weight by light scattering (LS) is commonly referred to as "absolute weight average molecular weight" or "Mw, Abs." The Mw,cc using conventional GPC molecular weight calibration curve ("conventional calibration") is often referred to as "polymer chain backbone molecular weight," "conventional weight average molecular weight," and "$Mw_{,GPC}$."

All statistical values with the "cc" subscript are determined using their respective elution volumes, the corresponding conventional calibration as previously described, and the concentration (Ci). The non-subscripted values are measured values based on the mass detector, LALLS, and viscometer areas. The value of $K_{PE}$ is adjusted iteratively, until the linear reference sample has a gpcBR measured value of zero. For example, the final values for a and Log K for the determination of gpcBR in this particular case are 0.725 and −3.391, respectively, for polyethylene, and 0.722 and −3.993, respectively, for polystyrene. These polyethylene coefficients were then entered into Equation 13.

Once the K and α values have been determined using the procedure discussed previously, the procedure is repeated using the branched samples. The branched samples are analyzed using the final Mark-Houwink constants obtained from the linear reference as the best "cc" calibration values are applied.

The interpretation of gpcBR is straight forward. For linear polymers, gpcBR calculated from Equation (14) will be close to zero, since the values measured by LS and viscometry will be close to the conventional calibration standard. For branched polymers, gpcBR will be higher than zero, especially with high levels of long chain branching, because the measured polymer molecular weight will be higher than the calculated Mw,cc, and the calculated IVcc will be higher than the measured polymer IV. In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular examples, the advantage of using gpcBR, in comparison to a traditional "g' index" and branching frequency calculations, is due to the higher precision of gpcBR. All of the parameters used in the gpcBR index determination are obtained with good precision, and are not detrimentally affected by the low 3D-GPC detector response at high molecular weight from the concentration detector. Errors in detector volume alignment also do not affect the precision of the gpcBR index determination.

Melt Force

A D-MELT apparatus (available from Goettfert GmbH Buchen, Germany) is used to determine melt force. The DMELT apparatus includes a commercial plastometer, and a digital balance incorporating a custom weighted sample. A molten polymer strand is extruded from a standard Plastometer barrel at a constant temperature (190° C.) through a standard ASTM D1238 MFR die (orifice height [8.000±0.025 mm] and diameter [2.0955±0.005 mm]) using a weighted piston. In the D-MELT apparatus, the extrudate is pulled through 2 free spinning rollers onto a drum driven by a stepper motor which is ramped over a velocity range during the analysis. The force of the polymer strand pulling up on the force sensor platform mounted tension roller is recorded by the integrated control computer in the D-MELT apparatus. From a curve fitting function of the acquired force data, the final reported value is determined based on a constant velocity ratio of the polymer strand speed versus the die exit speed (the exact velocity ratio depends on the product group). Measurement results are reported as melt elasticity ("ME") in centi-Newton (cN) or melt force ("MF") in milli-Newton (mN), depending on the rheometer type. Directly after the force measurement the melt index ("MI") measurement at ASTM conditions is performed with the same charge.

Melt Index

The term "melt index," or "MI" as used herein, refers to the measure of how easily a thermoplastic polymer flows when in a melted state. Melt index, or $I_2$, is measured in accordance by ASTM D 1238, Condition 190° C./2.16 kg, and is reported in grams eluted per 10 minutes (g/10 min). The I10 is measured in accordance with ASTM D 1238, Condition 190° C./10 kg, and is reported in grams eluted per 10 minutes (g/10 min).

Melt Strength

The term "melt strength," as used herein, refers to the measure of the maximum tension applied to a polymer in a melted state, before the polymer breaks. Melt strength is measured at 190° C. using a Göettfert Rheotens 71.97 (Göettfert Inc.; Rock Hill, SC). The melted sample (from 25 to 50 grams) is fed with a Göettfert Rheotester 2000 capillary rheometer, equipped with a flat entrance angle (180 degrees), and of length of 30 mm and diameter of 2 mm. The sample is fed into the barrel (L=300 mm, Diameter=12 mm), compressed, and allowed to melt for 10 minutes, before being extruded at a constant piston speed of 0.265 mm/s, which corresponds to a wall shear rate of 38.2 $s^{-1}$ at the given die diameter. The extrudate passes through the wheels of the Rheotens, located at 100 mm below the die exit, and is pulled by the wheels downward, at an acceleration rate of 2.4 millimeters per square second ($mm/s^2$). The force (measured in centiNewtons, cN) exerted on the wheels is recorded as a function of the velocity of the wheels (in mm/s). Samples are repeated at least twice, until two curves of the force (in cN) as a function of strand velocity (in mm/s) superimpose, then the curve that had the highest velocity at the strand break is reported. Melt strength (or "MS") is reported as the plateau force before the strand breaks, in units of centi-newtons, cN.

Nuclear Magnetic Resonance ($^1H$ NMR)

The term "nuclear magnetic resonance," or "NMR" or "Proton NMR," as used herein, refers to a spectral analysis of a material or compound that provides information regarding the chemical composition and structure of the material or compound. Samples for proton NMR were prepared using 0.1-0.2 g sample in 3.25 g of 30/70 wt/wt o-dichlorobenzene-d4/perchloroethylene (ODCB-d4/PCE) containing 0.001 M Chromium(III) acetylacetonate, $Cr(AcAc)_3$, prepared in a 10 mm tube. The samples were heated and vortexed at 115° C. to ensure homogeneity. Single pulse proton spectra were acquired on a Bruker AVANCE 600 MHz spectrometer equipped with a Bruker high-temperature CryoProbe and a sample temperature of 120° C. Spectra were acquired with ZG pulse P1=20 us (90° PW), 64 scans, AQ 1.82 s, $D_1$ 15 s.

Determination of the amount of Si—$CH_3$ per 1000 carbons and Si—CH═$CH_2$ (interchangeably referred to as "Si-vinyl") groups per 1000 carbons was performed by $^1H$ NMR spectrum obtained as described above. The total polymer protons were quantitated by integrating from about −0.5 ppm to 3 ppm, and this integral is set to a value of 2000, and thus represents 1000 carbons. The signal from the three Si-vinyl protons appear as three separate multiplets from about 5.8 ppm to 6.1 ppm. The $(D^{Vi})_4$ multiplet nearest 5.8 ppm partially overlaps one of the LDPE chain-end vinyl protons at about 5.76 ppm. Therefore only the two multiplets at about 5.92 ppm and 6.02 ppm are integrated and averaged to give moles of Si-vinyl per 1000 carbons.

BRIEF DESCRIPTION OF THE DRAWING

FIG. 1 is a graph showing melt force (MF) versus weight percent of MOCOS present in the formant ethylene/MOCOS copolymer in accordance with an embodiment of the present disclosure.

DETAILED DESCRIPTION

The present disclosure is directed to an ethylene-based polymer composition. In an embodiment, the ethylene-based polymer composition includes units derived from ethylene, units derived from a comonomer, and an optionally units derived from a termonomer. The comonomer is a monocyclic organosiloxane (MOCOS) of formula (I)

$$[R^1,R^2SiO_{2/2}]_n$$

wherein n is an integer greater than or equal to 3, each $R^1$ is independently a $(C_2\text{-}C_4)$alkenyl or a $H_2C{=}C(R^{1a})—C({=}O)—O—(CH_2)_m—$ wherein $R^{1a}$ is H or methyl, m is an integer from 1 to 4, and each $R^2$ is independently H, $(C_1\text{-}C_4)$alkyl, phenyl, or $R^1$.

The ethylene-based polymer composition includes (i) units derived from ethylene, (ii) units derived from comonomer (hereafter interchangeably referred to as "ethylene/MOCOS copolymer"), and (iii) optionally units derived from a termonomer (hereafter interchangeably referred to as "ethylene/MOCOS/terpolymer"), wherein the units of ethylene constitute a majority amount (wt %) of the monomers present in the polymer. In other words, the ethylene-based polymer composition includes ethylene monomer, MOCOS comonomer (and optional termonomer) each of the two monomers (or each of the three monomers when the termonomer is present) polymerized into the polymer backbone. In this way, the present ethylene-based polymer is structurally distinct compared to a polyethylene with a functional coagent grafted pendant to the polymer chain.

In addition to ethylene, the ethylene-based polymer composition includes units derived from a comonomer. The comonomer is a monocyclic organosiloxane of formula (I)

$[R^1,R^2SiO_{2/2}]_n$ (interchangeably referred to as "MOCOS" or "MOCOS comonomer"), formula (I) being a molecule containing a single ring substructure composed of silicon and oxygen atoms disposed in an alternating arrangement; and formula (I) containing unsaturated organo (hydrocarbonyl) groups; and optionally hydrogen ("H"), saturated substituent groups or aromatic substituent groups. At least two unsaturated organo groups and each of at least two silicon atoms in the ring substructure have at least one unsaturated organo group bonded thereto and wherein after accounting for the unsaturated organo groups and oxygen atoms, any remaining valences of the silicon atoms are bonded to the hydrogen atom, saturated substituent groups, or aromatic substituent groups; or collection of such molecules.

The MOCOS may be a monocyclic organosiloxane composed of a 6-member ring (n=3), an 8-member ring (n=4), a 10-member ring (n–5), or a 12-member ring (n=6). The ring substructure is composed of units of formula (I):

$[R^1,R^2SiO_{2/2}]_n$, wherein n is an integer greater than or equal to 3, or n is 3, or 4 to 5, or 6, each $R^1$ is independently a $(C_2\text{-}C_4)$alkenyl or a $H_2C{=}C(R^{1a})\text{—}C({=}O)\text{—}O\text{—}(CH_2)_m\text{—}$, wherein $R^{1a}$ is H or methyl, each $R^2$ is independently H, $(C_1\text{-}C_4)$alkyl, phenyl, or $R^1$ (as defined above). In each $[R^1,R^2SiO_{2/2}]$ unit, the $R^1$ group and the $R^2$ group is bonded to its respective silicon atom. The units may be designated using conventional organosiloxane shorthand notations simply as $D^{R1,R2}$ such that formula (I) becomes $[D^{R1,R2}]_n$. $R^1$ and $R^2$ can be the same or different.

Nonlimiting examples of suitable compounds for MOCOS of formula (I) include: $R^1$ is vinyl and $R^2$ is ethyl for MOCOS shorthand designation $D^{Vi,Et}$ wherein Vi is vinyl and Et is ethyl; $R^1$ is allyl and $R^2$ is ethyl for MOCOS shorthand designation $D^{Allyl,Et}$; $R^1$ is butenyl $(H_2C{=}C(H)CH_2CH_2\text{—})$ and $R^2$ is ethyl for MOCOS shorthand designation $D^{Butenyl,Et}$; $R^1$ is vinyl and $R^2$ is vinyl for MOCOS shorthand designation $D^{Vi,Vi}$; $R^1$ is allyl and $R^2$ is allyl for MOCOS shorthand designation $D^{Allyl,Allyl}$; $R^1$ is butenyl $(H_2C{=}C(H)CH_2CH_2\text{—})$ and $R^2$ is butenyl for MOCOS shorthand designation $D^{Butenyl,Butenyl}$; $R^1$ is vinyl and $R^2$ is phenyl for MOCOS shorthand designation $D^{Vi,Ph}$ wherein Ph is phenyl; $R^1$ is allyl and $R^2$ is phenyl for MOCOS shorthand designation $D^{Allyl,Ph}$; $R^1$ is butenyl $(H_2C{=}C(H)CH_2CH_2\text{—})$ and $R^2$ is phenyl for MOCOS shorthand designation $D^{Butenyl,Ph}$.

When $R^2$ is methyl $(CH_3)$, the unit may be designated more simply as $D^{R1}$ such that formula (I) becomes $[D^{R1}]_n$. Further nonlimiting examples of suitable compounds for MOCOS of formula (I) include: $R^1$ is vinyl and $R^2$ is methyl for MOCOS shorthand designation $D^{Vi}$; $R^1$ is allyl and $R^2$ is methyl for MOCOS shorthand designation $D^{Allyl}$; $R^1$ is butenyl $(H_2C{=}C(H)CH_2CH_2\text{—})$ and $R^2$ is methyl for MOCOS shorthand designation $D^{Butenyl}$.

In an embodiment, MOCOS of formula (I) each $R^1$ is independently $H_2C{=}C(R^{1a})$. $C({=}O)\text{—}O\text{—}(CH_2)_m\text{—}$ wherein $R^{1a}$ is H or methyl, and subscript m is an integer from 1, or 2 to 3 or to 4, and any range or individual value therein. In a further embodiment, each $R^2$ is independently $(C_1\text{-}C_2)$alkyl or $(C_2\text{-}C_3)$alkenyl; or each $R^2$ is independently $(C_1\text{-}C_2)$alkyl; or each $R^2$ is independently methyl.

In an embodiment, MOCOS of formula (I) is 2,4,6-trimethyl-2,4,6-trivinyl-cyclotrisiloxane, "$(D^{Vi})_3$" (CAS No. 3901-77-7) having Structure (B) below:

Structure (B)

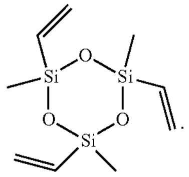

In an embodiment, MOCOS of formula (I) is 2,4,6,8-tetramethyl-2,4,6,8-tetravinyl-cyclotetrasiloxane, "$(D^{Vi})_4$" (CAS No. 2554-06-5), having Structure (C) below:

Structure (C)

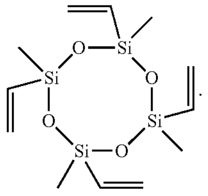

In an embodiment, MOCOS of formula (I) is 2,4,6,8,10-pentamethyl-2,4,6,8,10-pentavinyl-cyclopentasiloxane, $(D^{Vi})_5$.

The MOCOS comonomer of formula (I) is present in the ethylene-based polymer in an amount from 0.01 wt % to 2 wt %, or from 0.01 wt % to 0.5 wt %, or from 0.05 wt % to 0.45 wt %, or from 0.1 wt % to 0.40 wt %, or from 0.15 wt % to 0.30 wt %, or from 0.05 wt % to 0.15 wt %. Weight percent is based on total weight of the ethylene-based polymer composition.

In addition to the ethylene and the MOCOS comonomer, the ethylene-based polymer composition includes optional units derived from a termonomer. When present, the termonomer is an olefin, an unsaturated ester, a functionalized alkene, silane, and combinations thereof. Nonlimiting examples of suitable termonomer (when the termonomer is present) include propylene, $C_4\text{-}C_8$ alpha-olefin, acrylate, (meth)acrylate, vinyl acetate, vinyltrimethoxysilane, and combinations thereof. When the termonomer is present in the ethylene-based polymer, the termonomer is present in an amount from 0.5 wt % to 20 wt %, or from 1 wt % to 15 wt %, of from 3 wt % to 12 wt %, or from 5 wt % to 10 wt %. Weight percent is based on the total weight of the ethylene-based polymer composition.

In an embodiment, the present ethylene-based polymer composition includes the ethylene/MOCOS copolymer of formula (I) and also includes a termonomer of formula (II)

$[R^1,R^2SiO_{2/2}]_n$ formula (II)

wherein n is an integer greater than or equal to 3, each $R^1$ is independently a methyl group, a $(C_2\text{-}C_4)$ alkenyl or a $H_2C{=}C(R^{1a})\text{—}C({=}O)\text{—}O\text{—}(CH_2)_m\text{—}$ with the proviso at least two $R^1$'s are not a methyl group, wherein $R^{1a}$ is H or methyl, m is an integer from 1 to 4, and each $R^2$ is independently H, $(C_1\text{-}C_4)$alkyl, phenyl, or $R^1$.

The ethylene-based polymer composition may include one or more optional additives. When the additive is present, non-limiting examples of suitable additives include stabilizers, light stabilizers, UV absorbers, antioxidants, plasticizers, antistatic agents, pigments, dyes, nucleating agents, fillers, slip agents, fire retardants, processing aids, smoke inhibitors, peroxides, crosslinking coagents and scorch retardants, viscosity control agents and anti-blocking agents. The ethylene-based polymer composition may, for example, include less than 10 percent of the combined weight of one or more additives, based on the weight of the ethylene-based polymer composition.

In an embodiment, the ethylene-based polymer composition is treated with one or more stabilizers, for example, antioxidants, such as IRGANOX 1010, IRGANOX 1076 and IRGAFOS 168. In general, the ethylene-based polymer composition is treated with one or more stabilizers before extrusion or other melt processes.

In an embodiment, the ethylene-based polymer composition is an ethylene/MOCOS copolymer consisting of (i) ethylene and (ii) from 0.05 wt % to 0.5 wt % MOCOS copolymer selected from $(D^{Vi})_3$, $(D^{Vi})_4$, and $(D^{Vi})_5$, the ethylene/MOCOS copolymer having a Mw/Mn from 7.5 to 9.5, a vinyls content from 0.3600/1000 carbon atoms to 0.6200/1000 carbon atoms, a trans content from 0.1000/1000 carbon atoms to 0.3100/1000 carbon atoms, a MI from 2.0 g/10 min to 5.0 g/10 min, and a melt strength from 5.0 cN to 8.5 cN.

In an embodiment, the ethylene-based polymer composition is an ethylene/MOCOS copolymer consisting of (i) ethylene and (ii) from 0.05 wt % to 0.5 wt % $(D^{Vi})_4$, the ethylene/MOCOS copolymer composition having one, some, or all of the following properties:

(i) a Mw/Mn from 7.5 to 9.5; and/or
(ii) a vinyls content from 0.3600/1000 carbon atoms to 0.6200/1000 carbon atoms; and/or
(iii) a trans content from 0.1000/1000 carbon atoms to 0.3100/1000 carbon atoms; and/or
(iv) a MI from 2.0 g/10 min to 5.0 g/10 min, or from 2.5 g/10 min to 4.7 g/10 min; and/or
(v) a melt elasticity from 2.5 cN to 5.0 cN, or from 2.7 cN to 4.8 cN; and/or
(vi) a melt force from 20 mN to 40 mN, or from 22 mN to 37 mN; and/or
(vii) a melt strength from 5.0 cN to 8.5 cN, or from 5.5 cN to 8.5 cN.

In an embodiment, the ethylene-based polymer composition is an ethylene/MOCOS copolymer consisting of (i) ethylene and (ii) from 0.1 wt % to 0.5 wt % MOCOS copolymer selected from $(D^{Vi})_4$, the ethylene/MOCOS copolymer having a Mw/Mn from 7.0 to 7.5, a vinyls content from 0.5800/1000 carbons to 0.6200/1000 carbons, a trans content from 0.2000/1000 carbon atoms to 0.2500/1000 carbon atoms, and a MI from 35.0 g/10 min to 42.0 g/10 min.

In an embodiment, the ethylene-based polymer composition is an ethylene/MOCOS/MA terpolymer consisting of (i) ethylene, (ii) from 0.1 wt % to 0.5 wt % MOCOS and (iii) from 8 wt % to 12 wt % MA.

Applications

The ethylene-based polymer composition of the present disclosure may be employed in a variety of conventional thermoplastic fabrication processes to produce useful articles, including but not limited to monolayer and multilayer films; agricultural films, molded articles, such as blow molded, injection molded, or rotomolded articles; coatings; fibers; and woven or non-woven fabrics, cables, pipes, green house films, silo bag films, collation shrink films, food packaging films, foams. The present ethylene-based polymer composition is well-suited for applications requiring crosslinking by free radical methods, such as organic peroxides, such applications including, but not limited to, insulation for power cables.

The present ethylene-based polymer composition may be used in a variety of films, including but not limited to, clarity shrink films, agricultural films, collation shrink films, cast stretch films, silage films, stretch hood, sealants, and diaper backsheets. Other suitable applications include, but are not limited to, wire insulation, cable insulation, gaskets and profiles, adhesives; footwear components, and auto interior parts. The present ethylene-based polymer composition can be used as a part of the blend with LLDPE for agricultural films—big blown films.

By way of example, and not limitation, some embodiments of the present disclosure will now be described in detail in the following examples.

EXAMPLES

Materials used in the examples are set forth in Table 1 below.

TABLE 1

| Material | Description | Source |
|---|---|---|
| LDPE control | Ethylene homopolymer LDPE1 control 4MI<br>Ethylene homopolymer LDPE1A control 2MI<br>Ethylene/methyl acrylate copolymer control 6, 20 MI<br>Ethylene homopolymer LDPE 12 control 40 MI | Dow Inc. |
| comonomer MOCOS | 2,4,6,8-tetramethyl-2,4,6,8-tetravinyl-cyclotetrasiloxane, (CAS No. 2554-06-5) | Alfa Aesar |
| $(D^{Vi})_4$ | 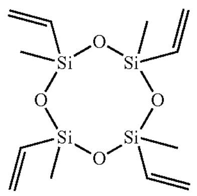<br>$(D^{Vi})_4$ | |
| Termonomer | Methyl acrylate (MA) | Parchem Fine and Specialty Chemicals |
| Organic peroxide | Luperox 26<br>t-butyl peroxy-2-ethylhexanoate | Arkema |
| Propylene | chain transfer agent | Praxair |

The amount of each material used in the inventive examples and in the comparative samples (controls) are provided in Table 2 below. A 545 milliliter (ml) stirred autoclave is charged with a mixture of ethylene, MOCOS ($(D^{Vi})_4$), propylene (as a chain transfer agent) and methyl acrylate (as a termonomer in comparative sample 6 and in inventive examples 7-8). Organic peroxide (Luperox 26) as a 0.5 wt %, 1 wt %, or 2 wt % solution in odorless mineral spirit was added as a polymerization initiator to the mixture, which was subjected to a set pressure of approximately 28,000 psi (1,969 kg/cm$^2$). Reactor temperature was set to a target temperature of 220° C. Under the polymerization conditions shown in Table 2, ethylene/MOCOS copolymers were continuously synthesized and subsequently converted into pellet forms by melt extrusion. The conditions listed in Table 2 are averages over the time span that the samples were collected. The "autoclave-made" experimental reactor copolymers thus formed were found to have the characteristics set forth in Table 3.

TABLE 2

Polymerization Conditions

| Example | Reactor Pressure (psi) | Reactor Temperature(° C.) | Ethylene feed rate (lb/hr) | $(D^{Vi})_4$ feed rate (lb/hr) | MA feed rate (lb/hr) | Propylene feed rate (lb/hr) | Initiator solution wt % | Initiator solution feed rate (cc/hr) | Reactor conversion (%) |
|---|---|---|---|---|---|---|---|---|---|
| 1 control | 28000 | 220.4 | 25.0 | 0 | 0 | 0.93 | 1.0 | 22.5 | 8.69 |
| 1A control | 28003 | 220.5 | 24.9 | 0 | 0 | 0.81 | 1.0 | 18.8 | 9.55 |
| IE2 | 27987 | 220.1 | 25.0 | 0.12 | 0 | 0.98 | 0.50 | 45.6 | 9.93 |
| IE3 | 28024 | 220.6 | 24.9 | 0.24 | 0 | 1.1 | 1.0 | 41.1 | 10.5 |
| IE4 | 28013 | 220.9 | 25.0 | 0.40 | 0 | 1.2 | 2.0 | 27.9 | 8.72 |
| 6 control | 28007 | 220.4 | 25.0 | 0 | 0.55 | 0.68 | 2.0 | 10.7 | 11.9 |
| IE7 | 28023 | 220.0 | 25.0 | 0.26 | 0.55 | 0.79 | 2.0 | 15.9 | 9.58 |
| IE8 | 28038 | 220.7 | 25.0 | 0.44 | 0.53 | 0.93 | 2.0 | 25.5 | 10.4 |
| IE10 | 27986 | 220.0 | 24.9 | 0.40 | 0 | 1.6 | 1.0 | 61.7 | 9.38 |
| IE11 | 28048 | 219.6 | 24.9 | 0.12 | 0 | 0.95 | 1.0 | 22.6 | 10.1 |
| 12 control | 27975 | 221.1 | 25.0 | 0 | 0 | 1.4 | 0.50 | 19.7 | 10.1 |
| IE13 | 28027 | 219.7 | 25.1 | 0.24 | 0 | 1.5 | 1.0 | 53.0 | 14.9 |

Control = comparative sample
IE = inventive example

The properties of resultant ethylene/MOCOS copolymers and ethylene/MOCOS/MA terpolymers are provided in Table 3 below.

TABLE 3

Properties for Ethylene/MOCOS Copolymer and Ethylene/MOCOS/MA Terpolymer

| | $(D^{Vi})_4$ * | MA * | MI target | MI measured | ME | MF | MS | Vinyls$^+$ | Trans$^+$ |
|---|---|---|---|---|---|---|---|---|---|
| 1 control | 0.0 | 0.0 | 4.0 | 4.15 | 1.647 | 12.79 | 3.32 | 0.3500 | 0.0522 |
| 1A control | 0.0 | 0.0 | 2.0 | 1.92 | NM | NM | NM | 0.3112 | 0.0489 |
| IE2 | 0.15 | 0.0 | 4.0 | 3.51 | 3.173 | 25.03 | 7.65 | 0.3837 | 0.1283 |
| IE3 | 0.3 | 0.0 | 4.0 | 3.47 | 3.727 | 29.48 | 6.33 | 0.4463 | 0.2043 |
| IE4 | 0.50 | 0.0 | 4.0 | 2.85 | 4.649 | 36.88 | 8.37 | 0.5121 | 0.2984 |
| 6 control | 0.0 | 10.0 | 2.0 | NM | NM | NM | NM | NM | NM |
| IE7 | 0.30 | 10.0 | 20 | NM | NM | NM | NM | NM | NM |
| IE8 | 0.50 | 10.0 | 20 | NM | NM | NM | NM | NM | NM |
| IE10 | 0.50 | 0.0 | 40 | 14.66 | NM | NM | NM | 0.6167 | 0.3008 |
| IE11 | 0.08 | 0.0 | 4.0 | 3.46 | 2.804 | 22.07 | 5.54 | 0.3786 | 0.1014 |
| 12 control | 0.0 | 0.0 | 40.0 | 40.46 | NM | NM | NM | 0.5447 | 0.0755 |
| IE13 | 0.30 | 0.0 | 40.0 | 37.25 | NM | NM | NM | 0.6092 | 0.2307 |

Control = comparative sample
IE = inventive example
MA = methyl acrylate,
ME = melt elasticity (cN),
MF = melt force (mN),
MI = melt index (g/10 minutes),
MS = melt strength (cN)
NM = not measured
* wt % $(D^{Vi})_4$ and wt % MA based on total weight ethylene-based polymer composition
$^+$Vinyls and trans are in mole %

TABLE 4

GPC Properties of ethylene/MOCOS copolymer

| | Conventional GPC | | | | | Absolute GPC | | | | | | Mw (Abs) |
|---|---|---|---|---|---|---|---|---|---|---|---|---|
| ID* | Mn | Mw | Mz | Mp | Mw/Mn | Mn | Mw | Mz(BB) | Mz(abs) | Mz + 1(BB) | Mz/Mw | Mw (GPC) |
| 1 control (0/4) | 11,471 | 82,089 | 410,969 | 41,675 | 7.16 | 11,976 | 182,857 | 886,632 | 6,210,161 | 1,986,555 | 33.96 | 2.23 |
| 1A control (0/2) | 12,213 | 93,388 | 433,074 | 44,680 | 7.65 | 13,354 | 202,853 | 862,196 | 4,839,926 | 1,867,682 | 23.86 | 2.17 |
| IE2 (0.15/4) | 11,157 | 92,663 | 578,964 | 38,805 | 8.31 | 11,742 | 217,508 | 1,076,795 | 5,248,199 | 2,253,696 | 24.13 | 2.35 |
| IE3 (0.30/4) | 10,975 | 102,163 | 782,298 | 35,617 | 9.31 | 10,526 | 294,562 | 1,357,367 | 7,140,095 | 2,527,086 | 24.24 | 2.88 |
| IE4 (0.50/4) | 9,731 | 84,220 | 635,113 | 30,984 | 8.65 | 9,018 | 230,250 | 1,176,708 | 6,549,265 | 2,396,283 | 28.44 | 2.73 |
| IE10 (0.50/40) | 9,566 | 89,026 | 795,450 | 27,402 | 9.31 | 9,040 | 303,637 | 1,357,442 | 8,346,058 | 2,315,738 | 27.49 | 3.41 |
| IE11 (0.08/4) | 11,984 | 90,702 | 528,185 | 39,741 | 7.63 | 12,089 | 213,760 | 1,033,855 | 5,597,665 | 2,163,215 | 26.19 | 2.36 |
| 12 control (0/40) | 9,824 | 50,535 | 235,963 | 32,082 | 5.14 | 9,163 | 89,364 | 581,899 | 3,775,070 | 1,439,047 | 42.24 | 1.77 |
| IE13 (0.30/40) | 8,997 | 64,132 | 522,051 | 25,620 | 7.13 | 8,253 | 182,120 | 1,099,960 | 7,415,758 | 2,092,632 | 40.72 | 2.84 |

*ID = Identification, wt % $(D^{Vi})_4$ is first value and MI is second value in the closed parentheses Proton NMR was used to characterize degree of incorporation/conversion of the $(D^{Vi})_4$ in selected samples. The Proton NMR detects the presence of Si—$CH_3$ and Si-vinyl. On average, 2.5 double bonds per molecule of $(D^{Vi})_4$ are incorporated into the polyethylene backbone (Table 5). Bounded by no particular theory, it is believed that the copolymerization of the $(D^{Vi})_4$ with the ethylene and the incorporation of two double bonds produces H-branched structures resulting in an unexpected increase in melt strength.

TABLE 5

NMR data for ethylene/MOCOS copolymer

| Sample | NMR Si-$CH_3$ per 1000 carbons | NMR Si-vinyl per 1000 carbons | Conversion (amount of double bonds consumed, %) |
|---|---|---|---|
| 2 | 0.41 | 0.15 | 63.4 |
| 3 | 0.76 | 0.26 | 65.7 |
| 4 | 1.28 | 0.44 | 65.6 |
| 10 | 1.21 | 0.43 | 64.4 |
| 11 | 0.23 | 0.08 | 65.2 |
| 13 | 0.72 | 0.27 | 62.5 |

FIG. 1 shows melt force v. weight percent $(D^{Vi})_4$ (from left to right) for control 1, IE11, IE2, IE3, and IE4 from Table 3. As shown in FIG. 1, even low levels (0.5 wt % IE4 down to 0.08 wt % IE11) of the $(D^{Vi})_4$ result in a dramatic increase in melt force compared to the melt force for the comparative sample LDPE, control 1. The linear regression line through the inventive examples in FIG. 1 indicates a very good linear fit among the inventive examples (correlation coefficient $R^2$ of 0.9989), while the y-intercept of the linear regression line (19.4 mN), which is much higher than the comparative example (12.8 mN), suggests highly non-linear behavior at very low levels of $(D^{Vi})_4$. That is, even very low levels of $(D^{Vi})_4$ lead to a surprisingly rapid rise in melt force; see for example IE11 0.08 wt % $(D^{Vi})_4$ with corresponding MF 22.07 mN and IE2 0.15 wt % $(D^{Vi})_4$ with corresponding MF 25.03 mN. The degree of effectiveness of $(D^{Vi})_4$ in increasing melt force at these low levels is an unexpected result.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. An ethylene-based polymer composition comprising:

units derived from ethylene, units derived from a comonomer, and an optionally units derived from a termonomer; and the comonomer is polymerized into the polymer backbone and is a monocyclic organosiloxane (MOCOS) of formula (I)

$$[R^1,R^2SiO_{2/2}]_n$$

wherein n is an integer greater than or equal to 3, each $R^1$ is independently a $(C_2\text{-}C_4)$ alkenyl or a $H_2C{=}C(R^{1a})—C({=}O)—O—(CH_2)_m—$ wherein $R^{1a}$ is H or methyl;

m is an integer from 1 to 4; and each $R^2$ is independently H, $(C_1\text{-}C_4)$ alkyl, phenyl, or $R^1$.

2. The ethylene-based polymer composition of claim 1 comprising from 0.01 wt % to 0.5 wt % of the MOCOS comonomer.

3. The ethylene-based polymer composition of claim 1 wherein the MOCOS comonomer is selected from the group consisting of 2,4,6-trimethyl-2,4,6-trivinyl-cyclotrisiloxane, 2,4,6,8-tetramethyl-2,4,6,8-tetravinyl-cyclotetrasiloxane, 2,4,6,8,10-pentamethyl-2,4,6,8,10-pentavinyl-cyclopentasiloxane, and combinations thereof.

4. The ethylene-based polymer composition of claim 1 wherein the ethylene-based polymer is an ethylene/MOCOS copolymer having (i) a Mw/Mn from 7.5 to 9.5, (ii) a vinyls content from 0.3600/1000 carbons to 0.6200/1000 carbons, and (iii) a trans content from 0.1000/1000 carbon atoms to 0.3100/1000 carbon atoms.

5. The ethylene-based polymer composition of claim 1 wherein the ethylene/MOCOS copolymer has (iv) an MI from 2.0 g/10 min to 5.0 g/10 min, and (v) a melt strength from 5.0 to 8.5 cN.

6. The ethylene-based polymer composition of claim 1 wherein the termonomer is present and is selected from the group consisting of an olefin, an unsaturated ester, a functionalized alkene, and combinations thereof.

7. The ethylene-based polymer of claim 6 wherein the ethylene-based polymer comprises from 0.01 wt % to 0.5 wt % of the MOCOS comonomer; and from 0.5 wt % to 20 wt % of the termonomer.

8. An article comprising the ethylene-based polymer composition of claim 1.

* * * * *